(12) United States Patent
Wehe et al.

(10) Patent No.: US 9,817,228 B2
(45) Date of Patent: Nov. 14, 2017

(54) MOVABLE MIRROR DEVICE

(71) Applicants: Carl Zeiss AG, Oberkochen (DE); Carl Zeiss Microscopy GmbH, Jena (DE)

(72) Inventors: Carsten Wehe, Weimar (DE); Dirk Thiele, Jena (DE)

(73) Assignees: Carl Zeiss Microscopy GmbH, Jena (DE); Carl Zeiss AG, Oberkochen (DE)

( * ) Notice: Subject to any disclaimer, the term of this patent is extended or adjusted under 35 U.S.C. 154(b) by 42 days.

(21) Appl. No.: 14/934,270

(22) Filed: Nov. 6, 2015

(65) Prior Publication Data
US 2017/0131539 A1 May 11, 2017

(51) Int. Cl.
*G02B 26/08* (2006.01)
*G01B 11/14* (2006.01)
*G02B 21/00* (2006.01)

(52) U.S. Cl.
CPC .......... *G02B 26/0833* (2013.01); *G01B 11/14* (2013.01); *G02B 21/0048* (2013.01)

(58) Field of Classification Search
CPC .. G02B 26/0833; G02B 26/10; G02B 26/105; G02B 21/0048; G01B 11/14
USPC ............. 359/213.1, 221.2, 223.1; 250/206.1, 250/208.3
See application file for complete search history.

(56) References Cited

U.S. PATENT DOCUMENTS

| | | | | |
|---|---|---|---|---|
| 4,838,632 A * | 6/1989 | Manian | ................ | H04N 1/113 359/221.1 |
| 5,694,237 A | 12/1997 | Melville | | |
| 5,774,207 A * | 6/1998 | Yoshida | ................ | G01B 11/00 356/141.4 |
| 7,009,752 B1 * | 3/2006 | Lorell | ................ | G02B 7/1821 359/198.1 |
| 8,173,947 B2 * | 5/2012 | Champion | ........... | G02B 26/108 250/208.3 |
| 8,570,502 B2 | 10/2013 | Richter et al. | | |
| 8,752,969 B1 * | 6/2014 | Kane | ................ | G02B 7/1821 356/139.05 |
| 9,678,209 B2 * | 6/2017 | Ruff | ................ | G01S 17/89 |
| 2002/0085594 A1 * | 7/2002 | Pezeshki | ................ | G02B 6/32 372/20 |
| 2002/0085806 A1 * | 7/2002 | Pezeshki | ................ | G02B 6/32 385/31 |
| 2002/0131146 A1 * | 9/2002 | Gee | ................ | G02B 6/357 359/291 |
| 2005/0036187 A1 * | 2/2005 | Sugawara | ........... | G02B 26/101 359/202.1 |
| 2005/0093818 A1 * | 5/2005 | Hatam-Tabrizi | ....... | G02B 26/10 345/156 |
| 2005/0152638 A1 * | 7/2005 | Barrett | ................ | G02B 6/266 385/17 |
| 2007/0253057 A1 * | 11/2007 | Potsaid | ................ | G02B 21/002 359/384 |
| 2009/0097108 A1 * | 4/2009 | Fox | ................ | A61B 5/0062 359/385 |
| 2010/0039629 A1 * | 2/2010 | Xalter | ................ | G02B 26/0833 355/67 |

(Continued)

*Primary Examiner* — Frank Font
(74) *Attorney, Agent, or Firm* — Seyfarth Shaw LLP; Brian Michaelis

(57) ABSTRACT

A movable mirror device is provided as a unitary device with a position sensor and an analog-to-digital converter included in the unitary device.

19 Claims, 6 Drawing Sheets

(56) References Cited

U.S. PATENT DOCUMENTS

| | | | |
|---|---|---|---|
| 2010/0079836 A1* | 4/2010 | Rothaar | G02B 26/101 359/223.1 |
| 2010/0225930 A1* | 9/2010 | Maeno | G01S 3/783 356/616 |
| 2011/0128602 A1* | 6/2011 | Hamano | G02B 13/0005 359/205.1 |
| 2012/0281024 A1* | 11/2012 | Champion | H04N 9/3129 345/690 |
| 2015/0015929 A1* | 1/2015 | Wilhelm | G02B 21/0088 359/226.1 |
| 2015/0204650 A1* | 7/2015 | Erlich | G02B 26/10 324/686 |

\* cited by examiner

FIG 4

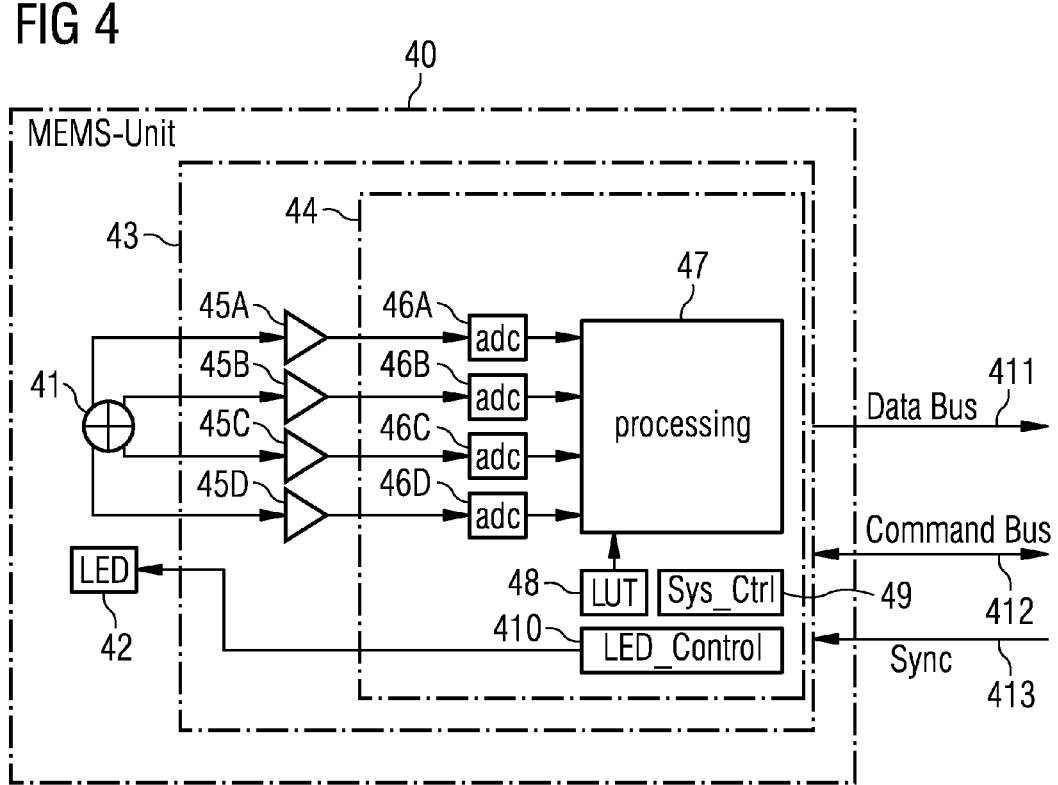

FIG 5

| Data Bus(3)    | Data Bus(2)    | Data Bus(1)    | Data Bus(0)    |
|----------------|----------------|----------------|----------------|
| ID_BIT_3       | ID_BIT_2       | ID_BIT_1       | ID_BIT_0       |
| Pos_Data_x_15  | Pos_Data_x_14  | Pos_Data_x_13  | Pos_Data_x_12  |
| Pos_Data_x_11  | Pos_Data_x_10  | Pos_Data_x_9   | Pos_Data_x_8   |
| Pos_Data_x_7   | Pos_Data_x_6   | Pos_Data_x_5   | Pos_Data_x_4   |
| Pos_Data_x_3   | Pos_Data_x_2   | Pos_Data_x_1   | Pos_Data_x_0   |
| Pos_Data_y_15  | Pos_Data_y_14  | Pos_Data_y_13  | Pos_Data_y_12  |
| Pos_Data_y_11  | Pos_Data_y_10  | Pos_Data_y_9   | Pos_Data_y_8   |
| Pos_Data_y_7   | Pos_Data_y_6   | Pos_Data_y_5   | Pos_Data_y_4   |
| Pos_Data_y_3   | Pos_Data_y_2   | Pos_Data_y_1   | Pos_Data_y_0   |

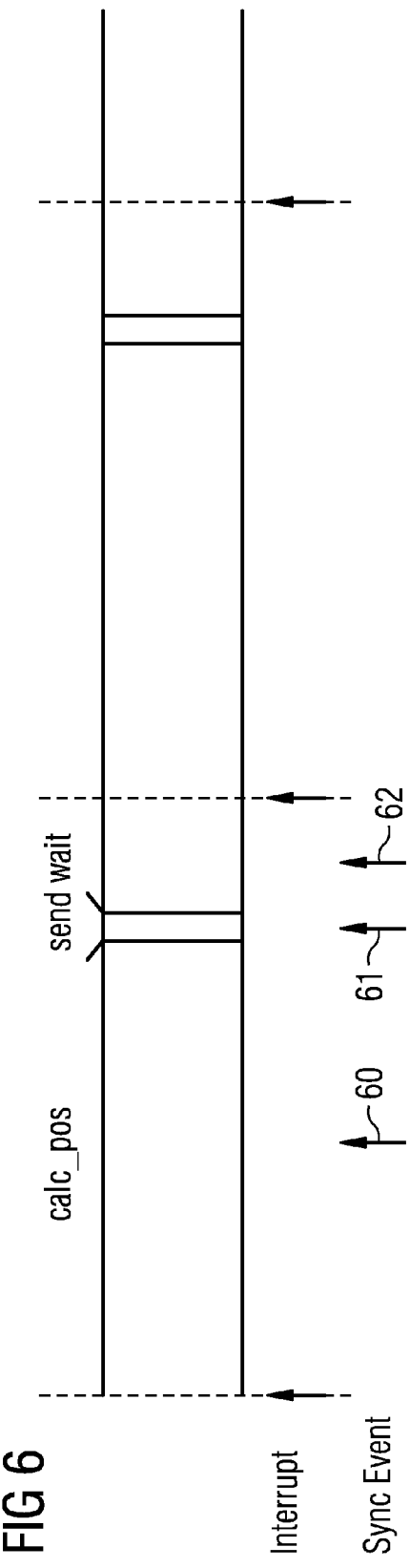
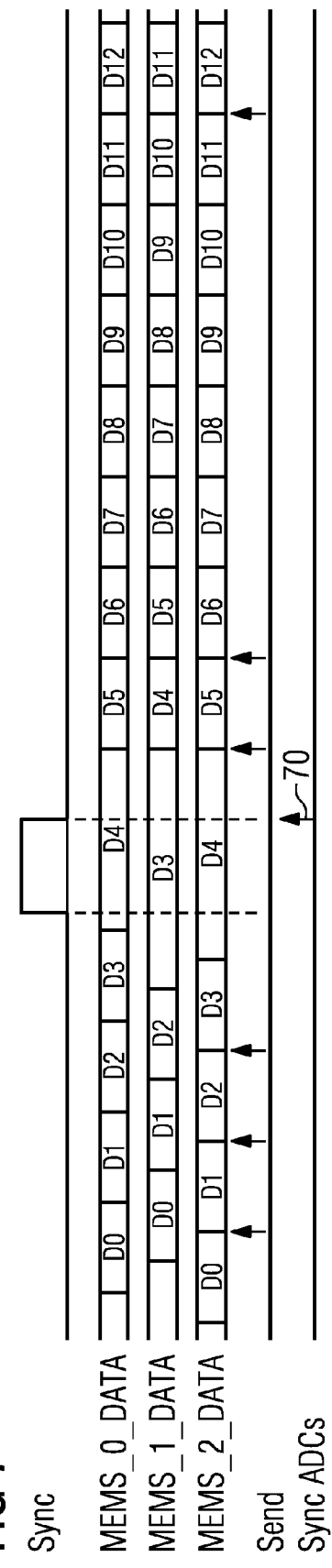

MOVABLE MIRROR DEVICE

TECHNICAL FIELD

The present application relates to movable mirror devices, and to laser scanners using such movable mirror devices as scanning mirrors.

BACKGROUND

In various applications, an area, for example an area of a sample to be examined, needs to be scanned with a light beam. For instance, in laser scanning microscopy (LSM), where a sample is scanned with a laser beam, and light emitted by the sample in response to being irradiated with the laser beam is detected. For scanning, the laser beam is directed at one or more tiltable mirrors, also referred to as scanning mirrors. By tilting the one or more mirrors, a position of the laser beam on the sample may be adjusted. For example, in some applications a single mirror tiltable about two perpendicular axes may be used. In other implementations, two successive mirrors each being tiltable only about one axis, the axes of the two mirrors being not collinear with each other, for example perpendicular to each other, may be used.

In many applications, additionally position sensors are employed to determine a current position of the one or more movable mirrors. Various kinds of such position sensors may be used.

Movable mirrors may for example be manufactured as microelectromechanical systems (MEMS). In such microelectromechanical systems, for example the parts actuating the mirror (i.e. moving the mirror), and in some cases also the mirror itself may be formed in a semiconductor wafer, for example a silicon wafer, together with electronic components.

Conventionally, such movable mirrors are provided as a device together with analog amplifiers amplifying one or more analog signals from a position sensitive device like a four quadrant diode. The amplified analog signals are then transmitted to some target hardware for example via a suitable connection (for example with a plug-in connector). In the target hardware, the amplified analog signals provided by the movable mirror device may then be digitized and further processed, for example to determine the position of the mirror and to control the mirror accordingly.

This approach may be disadvantageous in term of calibration needed for the mirror device and regarding flexibility. For example, a certain calibration may only be valid for a certain combination of scanning device and target hardware, such that when the scanning device needs to be replaced, a recalibration becomes necessary. Furthermore, because of the calibration being necessary, it is difficult for a single conventional movable mirror device to interact with different target hardwares.

SUMMARY

In some embodiments, a movable mirror device is provided which is implemented as a unitary device. The unitary device may comprise a position sensor device adapted to capture a position of a movable mirror, a processing device and at least one analog-to-digital converter adapted to convert an analog signal received directly or indirectly from the position sensitive device to a digital signal. The processing circuit in some embodiments may further implement one or more functions for processing the digital signals like filtering, correcting or determining a position of a movable mirror based on the signals.

The above summary is only intended to give an overview over some features of some embodiments and is not to be construed as limiting in any way. Other embodiments may include other features than the ones described.

BRIEF DESCRIPTION OF THE DRAWINGS

FIG. 4 is a more detailed block diagram of a movable mirror device according to some embodiments.

FIG. 5 is a diagram illustrating a data format usable in some embodiments.

FIGS. 6 and 7 are diagrams illustrating synchronization mechanisms according to some embodiments.

DETAILED DESCRIPTION

Figure 1:
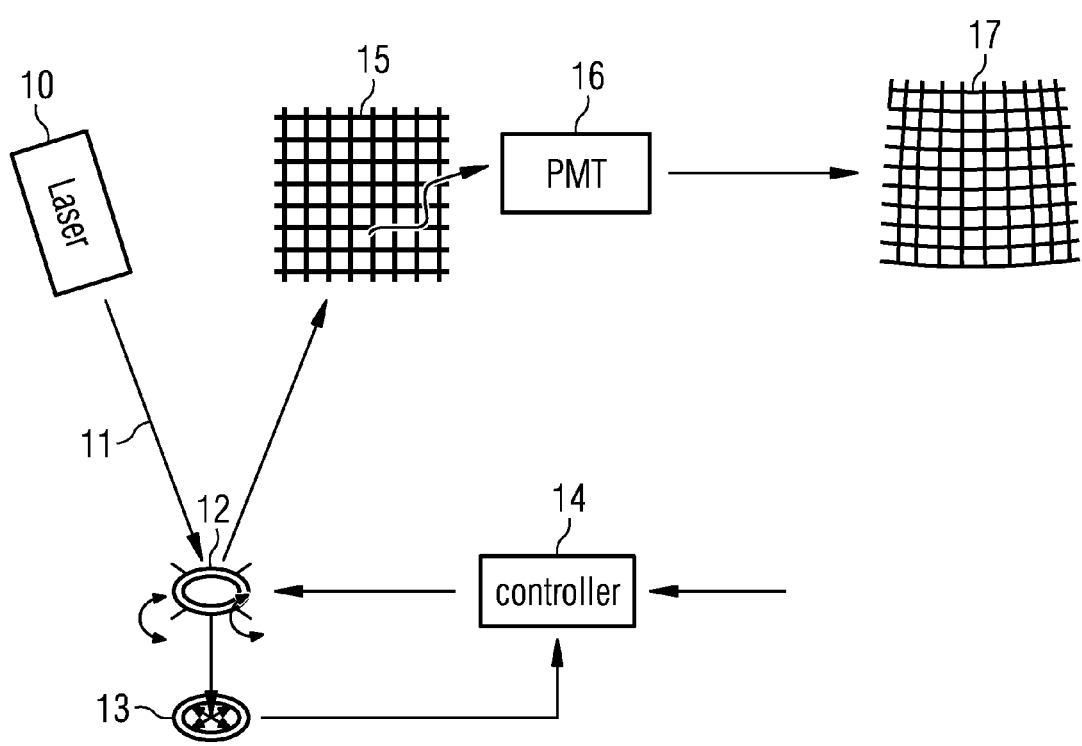
FIG. 1 is an illustration of a laser scanning microscope as an example application environment for embodiments.

In the following, various embodiments will be described in detail referring to the attached drawings. These embodiments are given by way of example only and are not to be construed as limiting. For example, while some embodiments may be described as comprising a plurality of features or elements, this is not to be construed as indicating that all these features or elements are necessary for an implementation. Instead, in other implementations or embodiments, some of the features or elements described may be omitted and/or may be replaced by alternative features or elements. Furthermore, in addition to the features explicitly described and shown in the drawings, additional features or elements, for example features or elements commonly used in movable mirror devices or laser scanning devices, may be provided without departing from the scope of the present application.

Features or elements from various embodiments may be combined to form further embodiments. Modifications or variations described with respect to one of the embodiments may also be applied to other embodiments.

In some embodiments, movable mirror devices are provided as unitary devices. A unitary device in the context of the present application is a device provided as a single unit. A unitary device may be a device where all components of the device are mounted or otherwise fixed to a single printed circuit board (PCB) or a plurality of printed circuit boards fixedly connected to each other; and/or a device where all components of the unitary device are provided in a single housing; and/or; a device where all components of the unitary device have a fixed spatial relationship with each other. In some cases, the unitary device may also be referred to as a package.

Movable mirror devices according to some embodiments may for example be used as scanning mirrors in laser scanner devices, for example laser scanning microscopes. To illustrate, FIG. 1 shows a schematic diagram of a laser scanning microscope where embodiments of movable mirror devices may be employed. FIG. 1 is only a simplified representation, and various components of conventional scanning mirror devices like pinholes may additionally be employed. However, it is emphasized that the use of movable mirror devices of embodiments is not limited to scanning applications like laser scanning microscopy applications, but may be used in various applications where a light beam (including for example infrared or ultraviolet light beams) is to be directed in a variable manner by moving a movable mirror. Other example applications include for example exposing printed circuit boards (PCBs) in photolithography processes or writing of structures on an object by means of a laser beam, but are not limited thereto.

In the laser scanning microscope system of FIG. 1, a laser 10 generates a laser beam 11. Laser beam 11 is directed to a scanning mirror 12. Scanning mirror 12 or parts thereof may be implemented as a microelectromechanical system (MEMS), for example a silicon based microelectromechanical system. Scanning mirror 12 in the example of FIG. 1 is tiltable about two perpendicular axes controlled by a controller 14. By tilting mirror 12, laser beam 11 may scan a sample 15.

Light emitted from sample 15 in response to being irradiated by laser beam 11 is captured in a time resolved manner by a photomultiplier tube (PMT) 16. By capturing the light emission from sample 15 in a time resolved manner, a current signal output by photomultiplier tube 16 may be associated with a corresponding current scanning position of laser beam 11 on sample 15. The current scanning position may be obtained based on a signal from a position sensor 13 measuring the position of scanning mirror 12. Based on the signal from photomultiplier tube 16, an image 17 of the sample is calculated. The above laser scanning microscopy approach may be implemented in any manner conventionally known in the art.

The system of FIG. 1 further comprises a position sensor including in the example of FIG. 1, a position sensitive device 13, for example a four quadrant diode. The position sensor further comprises a light source. Light from the light source like a light emitting diode (LED) is directed to a backside of scanning mirror 12. Backside in this context refers to the side of scanning mirror 12 which faces away from laser 10, while frontside refers to the side onto which laser beam 11 is directed. Light from the light source is reflected from the backside of mirror 12 onto position sensitive device 13. When scanning mirror 12 is tilted about its axes, the spot onto which light from the light source is reflected on position sensitive device 13 moves, thus allowing a detection of the movement and position of scanning mirror 12. Based on the position measured by position sensitive device 13 and on a control signal, a controller 14 controls the position of scanning mirror 12, for example to allow a scanning of sample 15. Other position sensors may also be used.

Scanning mirror 12 as well as position sensitive device 13 in embodiments, may be provided in a unitary device or package as a movable mirror device according to some embodiments. In case of an MEMS being used for scanning mirror 12 this unitary device may also be referred to as MEMS unit.

Controller 14 in some cases may be implemented as a computer device and may for example be connected to the MEMS unit via a cable or via a wireless connection.

Figure 2:
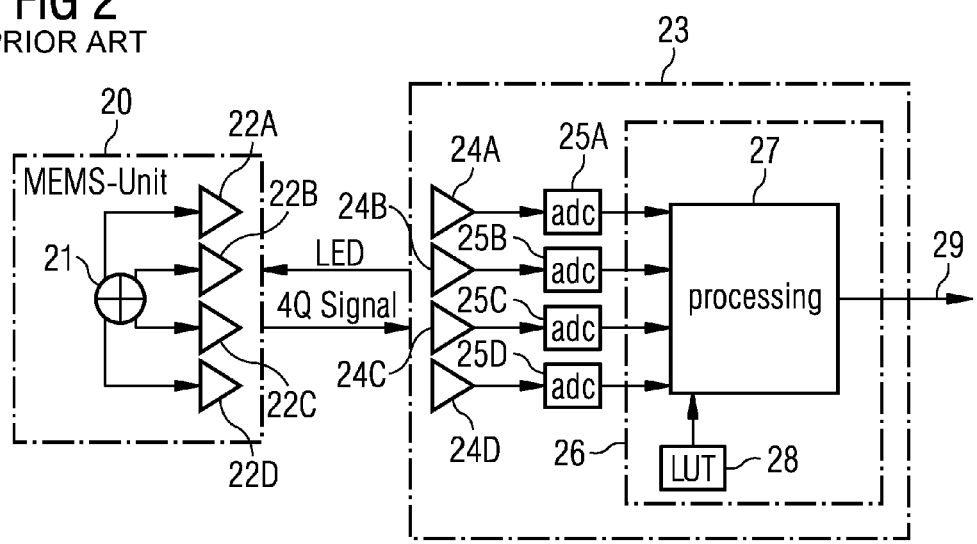
FIG. 2 is a block diagram of a conventional device.

For better understanding of the embodiments which will follow, FIG. 2 illustrates a conventional implementation of an MEMS unit as a comparative example for the embodiments which will be discussed later.

FIG. 2 illustrates a conventional MEMS unit 20 as a comparative example which comprises a quadrant diode 21 as a position sensitive device, a light emitting diode (not explicitly shown), and which embodiment may be modified according to the present disclosure to incorporate a MEMS movable mirror (not shown in FIG. 2, for example mirror 12 of FIG. 1). Furthermore, MEMS unit 20 comprises operational amplifiers 22a, 22b, 22c and 22d, collectively referred to as operational amplifiers 22 hereinafter. Each of amplifiers 22 is associated with one of the quadrants of four quadrant diode 21 and amplifies a signal from the respective quadrant. The amplified signals from amplifiers 22a-22d, which are analog signals, are transmitted to some target hardware 23 for further processing. This transmission may for example be via a cable connection, for example using a plug-in cable, or via a wireless connection. Target hardware 23 is therefore hardware distinct from MEMS unit in the comparative example of FIG. 2.

In target hardware 23, the analog signals received from MEMS unit 20 may be amplified via amplifiers 24a-24d (collectively referred to as amplifiers 24) and converted to digital signals via analog-to-digital converters (ADCs) 25a-25d (collectively referred to as analog-to-digital converters 25).

The digital output signals of analog-to digital converters 25 are provided to a processing device 26, which performs various kinds of processing 27. For example, processing 27 may comprise digital filtering, correction (for example a dark current correction), and determining a position of the movable mirror based on the signals from ADCs 25. The determination of the position may be based on values stored in a lookup table (LUT) 28. Values in lookup table 28 may for example be determined during a calibration process, where a mirror of MEMS unit 20 is brought into predefined positions and corresponding signals from quadrant diode 21 are measured. The correlation between measured signals and positions may then be stored in lookup table 28.

Processing device 26 may be implemented as a specially configured computational device, for example using a processor like a digital signal processor (DSP), a microcontroller (μC), or also fixed (hard-wired) logic provided e.g. as an FPGA (field programmable gate array) and combinations thereof together with any corresponding software to implement the special purpose functionality described herein.

The thus determined position of the movable mirror may then be output as indicated by an arrow 29 to further units, devices or components, and may for example be used in a controller like controller 14 to control movement of a mirror like mirror 12.

In the comparative example of FIG. 2, the content of the lookup table 28 has to be updated when for example MEMS unit 20 or target hardware 23 is replaced. In particular, both manufacturing tolerances of MEMS unit 20 and manufacturing tolerances in target hardware 23 (leading for example to differences in analog-to-digital converter behavior) influence lookup table 28. Therefore, a recalibration of the system is for example necessary when MEMS unit 20 is exchanged (for example due to faults).

Figure 3:
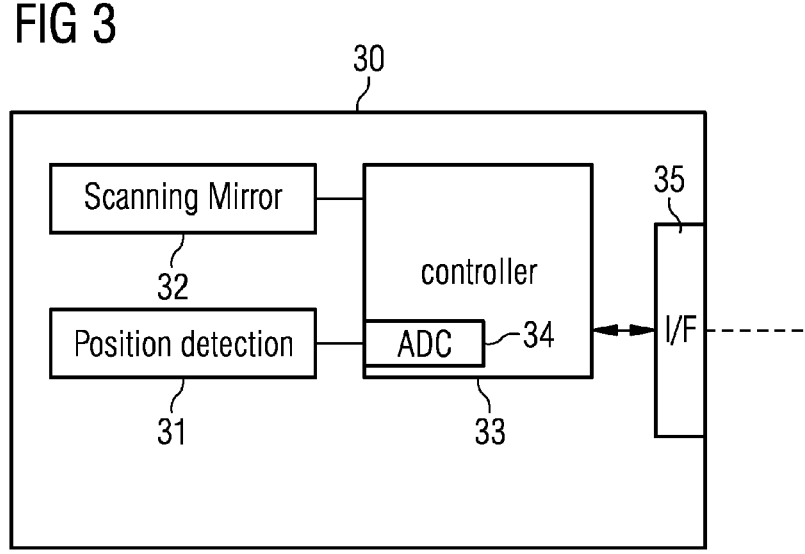
FIG. 3 is a block diagram of a movable mirror device according to an embodiment.

FIG. 3 illustrates a schematic block diagram of a movable mirror device 30 according to an embodiment. Movable mirror device 30 is provided as a unitary device. Movable mirror device 30 of the embodiment of FIG. 3 comprises a movable mirror 32, and a position sensor 31 associated with movable mirror 32. Movable mirror 32 may for example comprise a microelectromechanical system. Position sensor 31 may comprise a position sensitive device, for example a quadrant diode, and a light source as discussed above. Other position sensors may also be used. Furthermore, movable mirror device 30 comprises a controller 33 as an example for a processing device. Controller 33 may comprise a processor like a digital signal processor (DSP), a general purpose processor, hardwired logic, for example an FPGA (field programmable gate array) and/or memories storing software to perform functions discussed further below. Furthermore, controller 33 comprises one or more analog-to-digital converters 34 to convert one or more analog signals from position sensor 31 to digital values, which then may be further processed by controller 33. Therefore, in contrast to the comparative example of FIG. 2, in the embodiment of FIG. 3 the analog-to-digital converter 34 is provided with the unitary movable mirror device 30.

Controller 33 may in some embodiments determine a position of movable mirror 32 based on the digitized signal from position sensor 31. For example, controller 33 may comprise a lookup table. Such a lookup table may be obtained by calibration for example at a manufacturer who manufactures movable mirror device 30. Such calibration may for example comprise bringing the movable mirror to predefined positions and measuring the signal of position sensor 31, and storing the position together with the signal. For calibration, specific parameters like a lookup table may then be programmed via an interface, for example an interface 35 or an additional interface for calibration purposes, for example a serial interface. As movable mirror device 30 is a unitary device, the calibration may be performed in advance at a manufacturer, and device 30 may be easily replaced without the need for a recalibration. Controller 33 then may communicate the position to further devices, for example a target hardware, via an interface 35. In some embodiments, as will be explained later in more detail, interface 35 may be a bus interface.

In some embodiments, controller 33 may additionally control movable mirror 32 based on a control signal received via interface 35. Signals output by controller 33 to control movable mirror 32 may be amplified by a high voltage amplifier (HV-amplifier) in case movable mirror 32 requires high voltage signals, as it is often the case for MEMS mirrors. In other embodiments, the position of movable mirror 32 may be controlled directly via signals, e.g. signals having appropriate voltage levels, provided to movable mirror device 30 via interface 35 or any other connector, without involving controller 33.

In some embodiments, besides determining a position of movable mirror 32 based on a signal from position sensor 31, controller 33 may perform one or more further functions. For example, controller 33 besides the determined position may select signal values at internal nodes of movable mirror device 30 to be transmitted via interface 35. In some implementations, an output signal of ADC 34 or any other internal signal available to controller 33 may be transmitted via interface 35. In some embodiments, such signal values may be transmitted upon a request received via interface 35. Controller 33 may in some embodiments also perform filtering or correcting functions. In some embodiments, controller 33 may also assist in calibrating or determining other parameters of movable mirror device 30, for example determining coefficients of a filter for dark current suppression. Other functions may be provided in a target hardware coupled to movable mirror device 30, for example further functions for calibration or parameterization of device 30, further processing of position data or signals from system nodes or synchronizing transmission from movable mirror device 30. Examples for such synchronization will be discussed further below.

As mentioned, control of the movable mirror 32 may be performed in any conventional manner. In the embodiments which will be described next, therefore, the movable mirror and control thereof will not be discussed in any further detail.

FIG. 4 illustrates a further embodiment of a movable mirror device, in the example embodiment of FIG. 4 an MEMS unit 40, according to some embodiments. In the embodiment of FIG. 4, as discussed above, the movable mirror itself, which in this case may be implemented using a microelectromechanical system, is omitted and may be operated in any conventional manner. MEMS unit 40 in the embodiment of FIG. 4 is implemented as a unitary device.

MEMS unit 40 of FIG. 4 comprises a quadrant diode 41 and a light emitting diode (LED) 42 serving as an example for a position sensor. In operation, light emitting diode 42 illuminates a backside of a movable mirror, and light from light emitting diode 42 is reflected from the backside of the movable mirror onto four quadrant diode 41. A movement of movable mirror 41 (tilting about its axes) moves a reflection spot of light emitting diode 42 on four quadrant diode 41, which changes output signals of four quadrant diode 41.

The output signals of four quadrant diode 41 are provided to operational amplifiers 45*a*-45*d*, collectively referred to as operational amplifiers 45, for amplification.

In other embodiments, other kind of position sensors may be used, and one or more output signals of such position sensors may be provided to operational amplifiers if amplification is required. For example, instead of four quadrant diode 41, an extended p-i-n semiconductor structure may be used as position sensitive device to detect light reflected from the movable mirror. In other embodiments, a tilting angle of movable mirror 41 may be sensed via a capacitance change of the backside of mirror 41 or a comb structure associated with mirror 41. In yet other embodiments, the position of mirror 41 may be sensed using a resistive bridge structure sensing a torsion of a spring element associated with mirror 41 or a bending of a bending element associated with mirror 41, the spring or bending element changing its resistance with torsion or bending, respectively.

Output signals from operational amplifiers 45, which are analog amplified signals, are provided to analog-to-digital converters 46A-46D, respectively, to be converted into digital format. The thus generated digital signals are processed by a processing device 47. Processing device 47 may for example comprise a digital signal processor, a general purpose processor, hardwired logic or any other suitable components or circuits to perform the processing described below. For example, processing unit 47 may perform filtering of the signals from analog-to-digital converters 46, may correct them (for example to filter out or remove a dark current, i.e. a signal generated by four quadrant diode 41 even when it is not illuminated, or for offset correction). A dark current correction may for example be performed by measuring the dark current in a calibration (with light emitting diode 42 turned off) and then subtracting a digital representation of the measured dark current from signals measured during actual operation.

Furthermore, processing unit 47 may determine a position of the movable mirror based on the signal from ADCs 46 for example using a lookup table 48, essentially as explained above. In other embodiments, a polynomial fit between some predefined values may be used instead of a (full) lookup table. The position may be transmitted via a data bus 411 to a target hardware. The target hardware may process or use the position further, for example to control the movable mirror or to correlate the position to a signal obtained from a sample, as explained with reference to FIG. 1.

Furthermore, processing device 47 may also transmit other signals corresponding to signal values at some system nodes of MEMS unit 40 via data bus 411. For example, the outputs of analog to digital converters 46 (four values in the example of FIG. 4) may be transmitted without further processing. Also, output values of filter functions or values after dark current correction may be transmitted. The position may be provided as normalized values or as non-normalized values.

Figure 10:
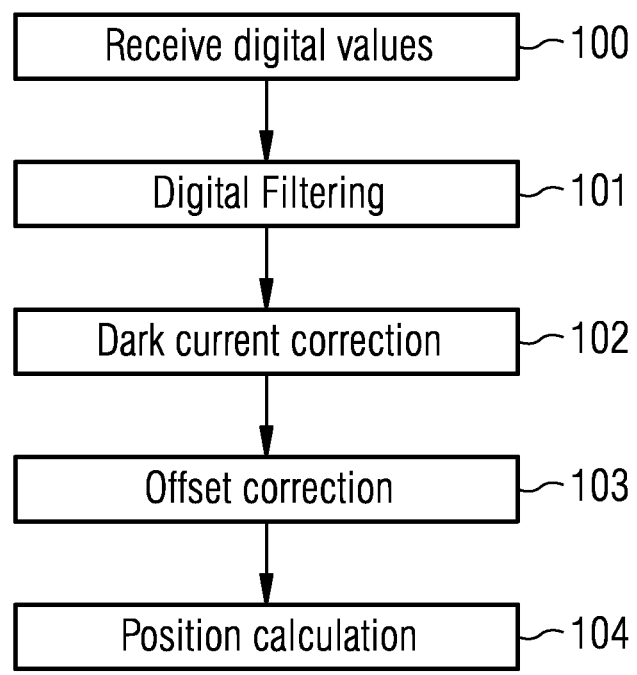
FIG. 10 is a flowchart illustrating operation of a processing device usable in some embodiments.

The above-mentioned functionality of processing device 47 is further illustrated in FIG. 10, which is a flowchart illustrating an example for processing in processing device 47. While FIG. 10 illustrates the processing as a series of acts or events, the order in which these acts or events are illustrated and described is not to be construed as limiting.

At 100 in FIG. 10, the processing device (for example processing device 47 of FIG. 3) receive digital values representative of signals from a position sensor (for example digital signals from analog-to-digital converters 46).

At 101, the processing device performs a digital filtering, for example at low pass filtering, high pass filtering, band-pass filtering, noise filtering etc.

At 102, the processing device performs a dark current correction. For example, previously stored correction values may be subtracted from the filtered digital values after 101.

At 103, the processing device performs an offset correction. Similar to 102, for example previously stored value may be added to or subtracted from the digital values after the dark current correction at 102.

At 104, the position of the movable mirror is calculated based on the offset corrected values after 103. For example, using a lookup table position values corresponding to the digital values may be read out of the lookup table, or an interpolation may be performed.

It has to be noted that depending on the implementation, only some of the acts or events described with respect to FIG. 10 may be implemented in a processing device. Moreover, the act or events may be performed in a different order than shown. Other implementations are also possible.

Furthermore, MEMS unit 40 in the embodiment of FIG. 4 comprises an LED controller for controlling light emitting diode 42. While LED controller 410 is depicted as a separate entity in FIG. 4, the functions of LED controller 410 described in the following may also be performed by processing unit 47. LED controller 410 may control light emitting diode 42 for example to ensure a constant illumination intensity over time.

For example, when operating MEMS unit 40, due to heating and aging an intensity (for example brightness) of light emitting diode 42 and therefore of a reflected spot on quadrant diode 41 may change (e.g. decrease), which changes the output signals of quadrant diode 41. Therefore, LED controller 410 in some embodiments may implement a control scheme for controlling the intensity of light emitting diode 42, for example by regulating a drive current accordingly. For example, LED controller 410 may implement a PI (proportional integral) controller. The controlling may be performed for example before each scanning during each scanning.

For example, for controlling in an embodiment during a calibration a sum signal of all four quadrants (e.g. a sum of the output signals of analog-to-digital converters 46) may be calculated and stored in a memory like a flash memory as a target value. During this measurement, in an embodiment the mirror is in a rest position, which may help to disregard changes in voltages for controlling the mirror. Before each scan, during an initialization, in embodiments the mirror again is brought to its rest position, and the sum signal of all four quadrants is obtained. Based on this sum signal and the target value previously stored, a current supplying light emitting diode 42 may be controlled and adjusted, for example using a PI control scheme. In embodiments, as soon as the difference between the current sum signal and the stored target value is within a predetermined tolerance range, initialization may be ended and scanning may start.

In other embodiments, a current supplying LED 42 may be controlled during scanning. For such an embodiment, the above-mentioned sum signal may for example be stored as a target value for each position of the movable mirror during an initial calibration. During scanning, for each scanning position or in regular or irregular intervals the sum signal is again formed and compared to the respective target value for the respective position, and a controlling of the LED current is performed as mentioned above.

As mentioned above, processing unit 47 may transmit data via data bus 411. Furthermore, in the embodiment of FIG. 4 a command bus 412 is provided, via which an external entity, for example the already mentioned target hardware, may control MEMS unit 40 for example to provide desired data of some internal nodes (like the ones mentioned above, for example ADC output values). Furthermore, a synchronization signal 413 may be received to synchronize transmitting of data via data bus 411, which will be explained below in further detail. For handling commands via the command bus and synchronization, a system controller 49 is indicated in FIG. 4, which may again be implemented using processing unit 47.

The MEMS unit 40 may be provided in different configurations for different embodiments. For example, as indicated by a dashed line 43, all components within dashed line 43 including operational amplifiers 45 may be provided as a single system on chip (SOC) integrating both digital components and the analog amplifiers 45. In another embodiment, as indicated by a dashed line 44, operational amplifiers 45 may be provided as discrete components and the components within dashed line 44 may be provided for example as a single microcontroller including analog to digital converters 46, or any other suitable piece of hardware. In yet another embodiment, also analog-to-digital converters 46 may be provided as discrete elements, such that a purely digital processing device may be used. In all of the above cases, all components of MEMS unit 40 are provided in a unitary device, for example mounted to a single printed circuit board or a combination of printed circuit boards coupled with each other in a fixed manner.

Next, functions of data bus 411, command bus 412 and synchronization input 413 will be explained in some more detail referring to FIGS. 5-7.

Data to be sent, for example position data or data regarding internal nodes as described above, may be sent via data bus 411 to one target hardware or a plurality of target hardwares. In some embodiments, a specific target hardware may be selected via an identification (ID) number or any other identification, which may precede payload data (e.g. position data). Each bit of such an ID number may represent a specific target hardware. For example, by setting more than one bit, the data may be sent to more than one target hardware. FIG. 5 shows an illustrative data transmission cycle via data bus 411. In the example of FIG. 5, which is given for illustration purposes only, a four bit transmission is used. The bits are labeled data bus(0) to data bus(3) in FIG. 5.

First, a four bit ID (ID-BIT_0 to ID_BIT_3) is sent. Each bit may correspond to a target hardware. In the example of FIG. 5, therefore four different target hardware entities may be addressed. In other embodiments, other bit widths may be used, and/or other codings for the ID may be used. Therefore, the illustrative data transmission cycle of FIG. 5 is merely a non-limiting example for illustration purposes, and other kinds of data transmission may also be used.

Following the ID number, in the example of FIG. 5 position data for an x-axis position (for example tilting about an x-axis of the movable mirror) and position data for a y-axis position (e.g. tilting about a y-axis) is transmitted. Each position (x and y) is represented as a 16 bit value in the example of FIG. 5, thus needing four 4 bit values for transmission. As mentioned, the transmission cycle of FIG. 5 serves only as an example. In case values of some internal nodes (for example output of values of ADCs) are to be transmitted additionally, these may for example be transmitted following the position data.

Next, the function of the command bus 412 will be explained in some more detail. The command bus, as mentioned, may be used to request or select in values of internal system nodes to be sent via the data bus.

Furthermore, command bus 412 may be used to program one or more system parameters of MEMS unit 40 and/or to control some additional functions of MEMS unit 40. Some non-limiting examples for control via command bus 412 will be explained below:

A sampling rate of analog-to-digital converters 46 may be adjusted via command bus 412.
Lookup table 48 may be updated, or other coefficients like filter coefficients may be provided via command bus 412.
Version numbers or internal system variables may be provided.
Parameters of a movable mirror used, for example a type of movable mirror or parameters of the movable mirrors, may be set.
A regulation of a current supplying light emitting diode 42 (for example as explained for LED controller 410) may be activated and deactivated.

The above are only non-limiting examples, and in other embodiments only some of these functions, or alternative functions, may be implemented using command bus 412.

Command bus 412 may for example be a serial bus, as a serial bus or serial interface is comparatively easy to implement and the functions performed via command bus 412 are in many embodiments not critical. However, other kinds of busses or interfaces may also be used.

Next, synchronization input 413 (for example via a sync signal received at input 413) will be discussed. The sync signal may be provided via a separate input as shown in FIG. 4, but in other embodiments may for example be provided via command bus 412. In some embodiments, via a sync signal, an external hardware (for example the above mentioned target hardware) may start synchronizing data output via data bus 411 and/or sampling times of analog-to-digital converters 46 at or to desired points in time. For example, in some embodiments more than one mirror may be used, and in such a case position signals indicating the position of the different mirrors, for which different MEMS units 40 may be provided, have to be processed in a coordinated manner. In such applications, it may be desirable that the sampling points and transmission of position data is performed at least essentially at the same time in different MEMS units 40. On the other hand, as the MEMS units 40 are different unitary devices, they may use different internal clockings, which may not be synchronized and/or which may lose synchronization over time due to slight differences between clocks.

For example, at low sampling rates time deviations between position signals might lead to errors in controlling the mirrors in some cases. For synchronization, a synchronization signal may for example be sent to all involved MEMS units at the same time.

In some embodiments, a signal at the synchronization input 413 with a first logic level (for example high) indicates that a synchronization is to be performed, while a signal at another logic level (for example low) does not influence operation of MEMS unit 40. In case a sync signal with the first logic level (for example high) is applied, in embodiments a current transmission of position data may be finished normally, but no new transmission is initiated as long as the synchronization signal is at the first logic level. The same may apply to sampling. In some embodiments, such a synchronization signal (set to the first logic level) may occur during three different phases of signal processing in MEMS unit 40. This is illustrated in FIG. 6.

In FIG. 6, a processing cycle comprises a calculation of position (calc_pos), followed by a transmission of data (send), followed by a wait phase (wait). Each cycle of these three phases is initiated by an interrupt, as marked by arrows. The first phase of calculating the position may comprise sampling the data by analog-to-digital converters 46 and performing a conversion to position data e.g. via a lookup table, as explained above. The send phase may comprise transmitting the position data via data bus 411. The wait phase separates this cycle from the next cycle. As indicated by arrows 60, 61 and 62, a synchronization event (setting the synchronization signal to the first logic level) may occur in each of the three phases. In some embodiments, irrespective of the phase, the current cycle is finished, but no new cycle is started as long as the synchronization signal is at the first logic level. In other embodiments, for example only if the synchronization occurs during the transmission (arrow 61), the sending is finished and otherwise the cycle is aborted. Other schemes may also be used.

In some embodiments, as soon as the synchronization signal goes to the second logic level again, the cycle is started with the position calculation calc_pos.

FIG. 7 illustrates such a synchronization for three MEMS unit like MEMS units 40 of FIG. 4 or movable mirror device 30 of FIG. 3. A line MEMS_0_DATA illustrates data transmission from a MEMS unit #0, MEMS_1_DATA illustrates data transmission from MEMS unit #1, and MEMS_2_DATA illustrates data transmission from an MEMS unit #2. In a line labeled "send", some points in time where calculated data units are sent are marked. As can be seen, at the beginning (left side of FIG. 7) the data transmissions from the various MEMS units are not in synchronization with each other. Then, a sync pulse is applied (first line in FIG. 7), e.g. a value of the sync signal goes from low to high to start the pulse and then to low again to end the pulse. A length of the sync pulse may be longer than a send time such that during the sync pulse sending of data in progress may be terminated, in particular longer than the time for a complete cycle including analog-to-digital conversion, position calculation and sending of data. With a falling edge of the sync pulse, as indicated by an arrow 70, in an embodiment sampling of the analog-to-digital converters 46 starts. Therefore, the cycle illustrated in FIG. 6 is started in all MEMS units. Therefore, after the synchronization the sending of data occurs essentially at the same time in all MEMS units. For example, when the sync pulse asserts a high value, a last or current transmission of position data is completed in all MEMS units, and then a wait state is assumed until the sync pulse goes back to a low value. In some embodiments, such a synchronization may be performed in regular or irregular intervals, for example when transmission from various MEMS units differ by more than a predetermined value.

The signals and formats illustrated in FIGS. 5 to 7 serve only for further illustration, and in other embodiments other formats may be used depending on a particular implementation.

MEMS units and movable mirror devices as defined above may for example be used in laser scanning applications, as illustrated in FIG. 1, but are not limited thereto. More than one MEMS unit and/or more than one target hardware may be used, as already mentioned. To illustrate this further, FIGS. 8 and 9 show two different, non-limited application scenarios.

Figure 8:
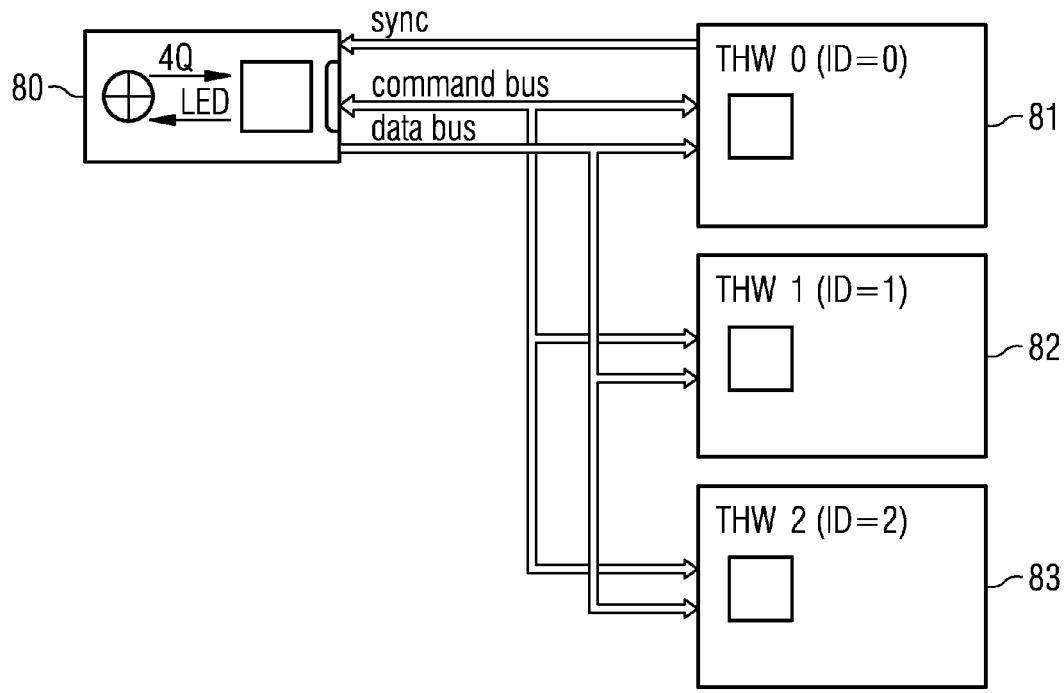
FIGS. 8 and 9 are diagrams illustrating systems according to some embodiments.

FIG. 8 illustrates a scenario where a single MEMS unit 80 is coupled to three target entities 81, 82 and 83. Target hardware entities may be selected as receiving data via a data bus for example via their identifications, as explained with respect to FIG. 5. In the example application of FIG. 8, all target hardware entities 81 to 83 are coupled with MEMS unit 80 via a command bus and a data bus. Synchronization as explained above is performed only by target hardware 81. Therefore, in this case adjustment and control of MEMS unit 80 apart from synchronization may be performed by each of target hardware entities to 83.

Figure 9:
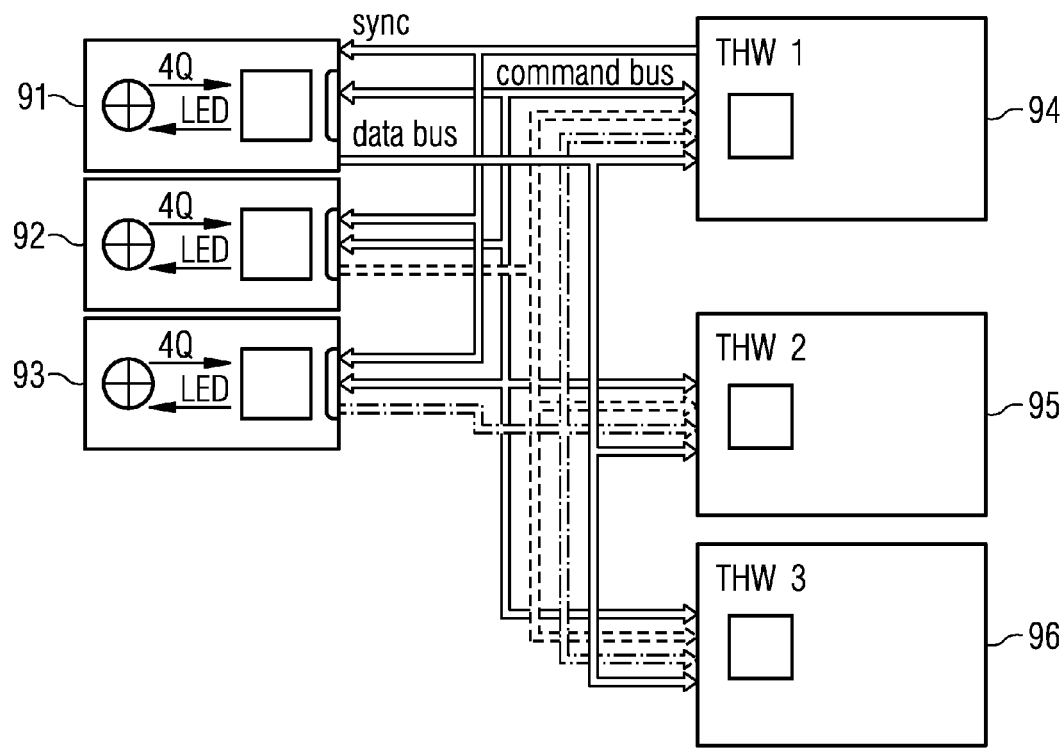

FIG. 9 illustrates a further application scenario where three MEMS units 91, 92 and 93 are coupled with three target hardware entities 94, 95 and 96 via a command bus and data busses. Synchronization is performed again only by target hardware 94. Each MEMS unit can, by choosing an ID, select which target hardware entities 94 to 96 should receive process for example position data.

The bus structures as illustrated above are only examples, and other bus structures may also be used. For example, the various functions (data bus, command bus and synchronization) may also be implemented on a single physical bus, for example using time division duplexing (TDD), frequency division duplexing (FDD) or any other duplexing or multiplexing technics commonly employed for bus systems. Instead of bus systems, in other embodiments point-to-point connections may be used.

MEMS units as discussed herein may have one or more of the following advantages in some embodiments. In other embodiments, the MEMS units may have other properties.

In some embodiments, the MEMS units may be coupled in an easy manner with various components of target hardware and directly may deliver position data. Therefore, no calibration due to some relevant components being in the target hardware and others being in the MEMS unit are necessary.

Position data may be provided to different target hardware entities, as illustrated for example in FIGS. 8 and 9.

No separate analog-to-digital converters have to be provided on the target hardware.

In some embodiments, a signal quality may be increased, as for example analog signals of operational amplifiers do not have to be transmitted via longer distances to a target hardware. Sending digital data may be more robust against noise sources.

A control of a LED current may be easily implemented.

In some embodiments, information and parameters may be stored in a memory of a processing unit, for example a flash memory.

In embodiments where a sampling rate is programmable, various mirror types with different mechanical properties may be supported, for example in case of resonance scanners having different resonance frequencies.

In some embodiments, a synchronization signal may enable a synchronization between various MEMS units.

Control of the MEMS units may be easily implemented via a serial interface.

The above-described embodiments serve only as an example, and variations and modifications are apparent to persons skilled in the art and considered to be within the scope of this disclosure.

What is claimed is:

1. A movable mirror device, comprising:
a movable mirror,
a position sensor adapted to measure a position of the movable mirror and to output at least one analog position signal,
an analog-to-digital converter adapted to convert an analog signal based on the at least one position signal to a digital position signal, and
a processing device adapted to determine a position of the movable mirror based on the digital position signal, said processing device accessing a stored lookup table to translate the digital position signal to a position of the movable mirror,
wherein the movable mirror device is provided as a unitary device.

2. The movable mirror device of claim 1, wherein the analog-to-digital converter is integrated in the processing device.

3. The device of claim 1, wherein the movable mirror comprises a microelectromechanical system.

4. The device of claim 1, wherein the position sensor comprises a four quadrant diode and a light source to illuminate a backside of the movable mirror such that a reflection from the backside of the scanning falls on the four quadrant diode.

5. The device of claim 4, wherein the processing device is further adapted to control a current supplying the light source.

6. The device of claim 5, wherein the processing device comprises a flash memory, the flash memory storing a target value of a sum signal from all quadrants of the four quadrant diode, and controlling the current comprising obtaining a current sum signal and feeding the current sum signal and the target sum signal to a controller of the processing device.

7. The device of claim 1, further comprising a digital interface, wherein the processing device is configured to transmit position information via the digital interface.

8. The device of claim 7, wherein the processing device is further configured to transmit values of internal nodes of the movable mirror device via the digital interface.

9. The device of claim 8, wherein the values of internal nodes comprise one or more of an output value of the analog-to-digital converter, an output value of a filter, an output value of a dark current correction or non-normalized position data.

10. The device of claim 1, further comprising a command interface to receive control commands.

11. The device of claim 10, wherein the control commands comprise one or more of a sampling rate of the analog-to-digital converter, setting of internal coefficients, setting of a lookup table for position calculation, setting of a version number, setting of an internal system variable, setting of a parameter of the movable mirror, an activation or deactivation of a current regulation for a light source of the position sensor, and a selection of internal system nodes for transmission.

12. The device of claim 10, wherein the command interface is a serial interface.

13. The device of claim 1, further comprising a synchronization input, wherein the processing device is adapted to synchronize transmission of position information based on a signal of the synchronization input.

14. A system, comprising:
a movable mirror device, the movable mirror device comprising:
a movable mirror,
a position sensor adapted to measure a position of the movable mirror and to output at least one position signal,
an analog-to-digital converter adapted to convert an analog signal based on the at least one position signal to a digital position signal, and
a processing device adapted to determine a position of the movable mirror based on the digital position signal, said processing device accessing a stored lookup table to translate the digital position signal to a position of the movable mirror,
wherein the movable mirror device is provided as a unitary device; and
a target hardware is coupled to the movable mirror device and configured to receive position information indicating a position of the movable mirror from the movable mirror device.

15. The system of claim 14, wherein the movable mirror device is coupled to the target hardware via at least one digital bus.

16. The system of claim 14, wherein the target hardware is configured to transmit a synchronization signal to the movable mirror device.

17. The system of claim 14, comprising a plurality of movable mirror devices coupled to the target hardware.

18. The system of claim 14, comprising a plurality of target hardware entities coupled to the movable mirror device via a bus system.

19. A laser scanning microscope, comprising:
a laser,
a movable mirror device, the movable mirror device comprising:
a movable mirror,
a position sensor adapted to measure a position of the movable mirror and to output at least one position signal,
an analog-to-digital converter adapted to convert an analog signal based on the at least one position signal to a digital position signal, and
a processing device adapted to determine a position of the movable mirror based on the digital position signal, said processing device accessing a stored lookup table to translate the digital position signal to a position of the movable mirror,
wherein the movable mirror device is provided as a unitary device,
the movable mirror device being controllable to scan a sample with a laser beam generated by the laser, and
a light detector configured to detect light from the sample in response to the sample being irradiated with the laser beam.

* * * * *